(12) United States Patent
De Natale et al.

(10) Patent No.: US 8,937,795 B2
(45) Date of Patent: Jan. 20, 2015

(54) POWER AND CONTROL UNIT FOR A LOW OR MEDIUM VOLTAGE APPARATUS

(75) Inventors: Gabriele Valentino De Natale, Milan (IT); Andrea Bianco, Sesto San Giovanni (IT)

(73) Assignee: ABB Technology AG, Zurich (CH)

( * ) Notice: Subject to any disclaimer, the term of this patent is extended or adjusted under 35 U.S.C. 154(b) by 824 days.

(21) Appl. No.: 13/182,698

(22) Filed: Jul. 14, 2011

(65) Prior Publication Data

US 2012/0014018 A1    Jan. 19, 2012

(30) Foreign Application Priority Data

Jul. 15, 2010 (EP) .................................... 10169635

(51) Int. Cl.
*H02H 3/00* (2006.01)
*H01H 47/00* (2006.01)
*H02H 3/04* (2006.01)

(52) U.S. Cl.
CPC ............ *H01H 47/002* (2013.01); *H02H 3/044* (2013.01)
USPC ......................................................... 361/62

(58) Field of Classification Search
CPC ..... H01H 71/123; H01H 83/20; H01H 53/10; H01H 47/00; H02H 3/04; H02H 3/08; H02H 1/00; H02H 9/08; H02H 3/00
See application file for complete search history.

(56) References Cited

U.S. PATENT DOCUMENTS

| 5,777,834 | A | 7/1998 | Lehner et al. | |
| 6,426,856 | B1 * | 7/2002 | Schneerson et al. | 361/79 |
| 7,221,548 | B2 * | 5/2007 | Bauer | 361/42 |
| 7,468,871 | B2 * | 12/2008 | Jackson et al. | 361/42 |

FOREIGN PATENT DOCUMENTS

| EP | 2149895 | 2/2010 |
| JP | 1185123 | 7/1989 |

* cited by examiner

*Primary Examiner* — Jared Fureman
*Assistant Examiner* — Terrence Willoughby
(74) *Attorney, Agent, or Firm* — Novak Druce Connolly Bove + Quigg LLP

(57) ABSTRACT

A power and control unit for low and medium voltage applications, operatively couplable to one or more circuit elements of a low or medium voltage apparatus, is provided. The unit includes an internal self-diagnostic circuit element operatively coupled to a signal-generating circuit element, a binary input operatively coupled to the internal self-diagnostic circuit element, and a low-impedance variable load connectable in parallel to the binary input. The binary input includes a control circuit element operatively connected to the low-impedance variable load and also operatively connected, through a signal-detecting circuit element, to the internal self-diagnostic circuit element and to the one or more circuit elements of the low or medium voltage apparatus.

19 Claims, 3 Drawing Sheets

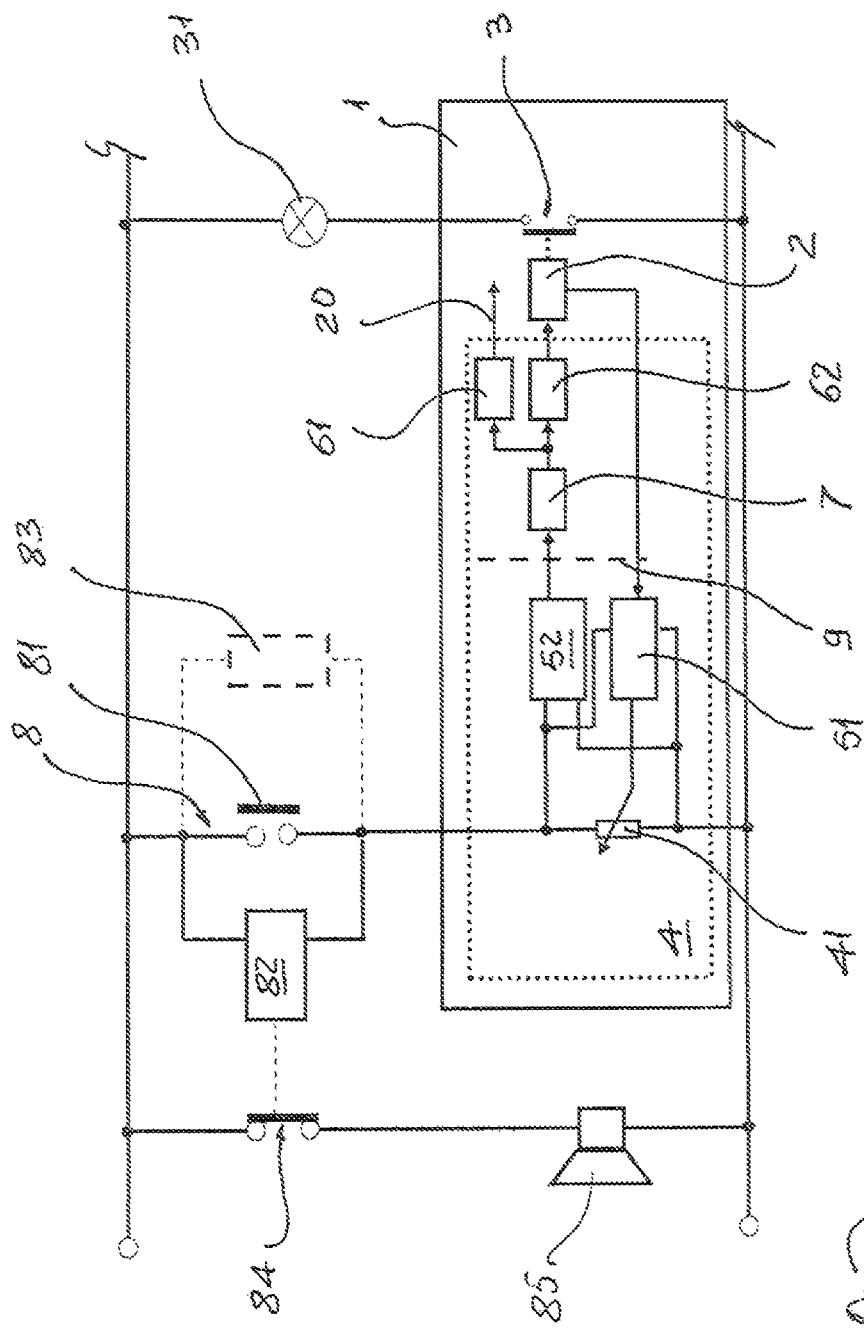

POWER AND CONTROL UNIT FOR A LOW OR MEDIUM VOLTAGE APPARATUS

CROSS REFERENCE TO RELATED APPLICATIONS

This application claims priority to Application No. 10169635.9 filed in Europe on Jul. 15, 2010 under 35 U.S.C. §119, the entire contents of which are hereby incorporated by reference.

The present invention relates to a power and control unit for a low and medium voltage apparatus having improved features in terms of performances and functionality. The power and control unit of the invention is conveniently used in trip circuits of low or medium voltage apparatuses. For the purposes of the present application the term medium voltage is referred to applications in the range of between 1 and 50 kV and low voltage is referred to applications in the range below 1 kV.

Electronic devices for power and control purposes are conveniently used in low and medium voltage apparatuses (e.g., circuit breakers, contactors, disconnectors) to actuate said apparatuses. The power and control electronic devices generally include some binary inputs to acquire status information and receive remote opening and closing commands for the low or medium voltage apparatus. Thus, typically binary inputs are used for trip commands and interlocking signals.

Electronic devices also include electronic drivers for actuators, binary outputs, automation functions and protection functionalities. In recent times, diagnostic functions have been introduced into the electronic device to check the functionalities. In particular, electronic devices are able to check the actuators (coil/motor supervision), the internal power circuit (over-current and over-temperature protections), the capacitor banks used to store the energy for operation in magnetic actuated circuit breaker (capacitor supervision).

As an example, for trip commands, binary inputs are usually part of a trip circuit which comprises a protection relay which generates a trip command. The electronic devices then operates the apparatus according to said trip command. The binary inputs of the electronic devices for power and control purposes typically have also to interface the trip circuit supervision function which is available in the binary outputs of the protection relay. The trip circuit supervision function is designed to check the continuity of apparatus controlled by the power and control electronic device (e.g. a coil) when the apparatus is not energized. Generally, it is able to detect an open circuit and generate an alarm indicating that the command chain is not working. Therefore the binary inputs should allow a minimum current to circulate during normal operation and the current circulation should be blocked to activate the trip circuit supervision alarm. A possible implementation already known in the art, consists in a power resistor connected in parallel to the binary input. However such a solution has a number of disadvantages and drawbacks.

As a first disadvantage, it can be mentioned that the power resistor is always connected in parallel to the binary input. When the binary input is driven with the high level control voltage, the power resistor generates high power that must be dissipated inside the power and control electronic device. A further disadvantage derives from the fact that in order to reduce power consumption and thermal heating the value of the resistor is kept as high as possible. This generates some problems of interoperability with the trip circuit supervision function of some relay. Still another disadvantage derives from the fact that this solution only allows to check the cable connection between the trip circuit supervision relay and the power and control electronic device and does not allow to detect failures in the power and control electronic device or in the low or medium voltage apparatus.

An improvement has been achieved by using a low impedance feedback that allows the electronic device diagnostic to reveal a failure using the binary input. With reference to FIG. 1, in such known method, an electronic device 10 is connected to a trip circuit 8, including a trip circuit supervision relay 82 and a contact 81. In turn, the trip circuit supervision relay 82 can be operatively connected to an alarm 85 through a switch 84. The electronic device 10 includes a binary input 15, as well as diagnostic function(s) 11, and is connected to one or more functions 20 of a low or medium voltage apparatus.

Contact 81 controls the binary input 15, the diagnostic circuit being designed to work when contact 81 is open. By connecting an appropriate low impedance 14 in parallel, it is possible to allow a low current to circulate in the binary input circuit. The low impedance feedback functionally 12 allows the electronic device diagnostic 11 to reveal a failure using the binary input 15, a high impedance circuit indicating that a failure has occurred. However, neither the trip circuit supervision relay 82 nor the electronic device diagnostic 11 can check the input signal sensing block 13 of the binary input 15. Thus, even if the above system allows diagnostic functions to be carried out, it is still not available a device and method to verify the functionality of the binary inputs used in electronic devices for low and medium voltage applications.

It is therefore an object of the present invention to provide a power and control unit for low and medium voltage applications that solves the above-mentioned problems.

More in particular, it is an object of the present invention to provide a power and control unit for low and medium voltage applications having improved performance in terms of failure detection functionalities.

As a further object, the present invention is aimed at providing a power and control unit for low and medium voltage applications that is able to detect failures in the connections or in the power and control unit, as well as to detect the functionality of the binary inputs used in the power and control unit itself.

Still another object of the present invention is to provide a power and control unit for low and medium voltage applications that can be easily and effectively interfaced with existing low and medium voltage apparatuses.

Still another object of the present invention is to provide a power and control unit for low and medium voltage applications that can be easily manufactured and at competitive costs.

Thus, the present invention relates to a power and control unit for low and medium voltage applications operatively couplable to one or more functions of a low or medium voltage apparatus.

The power and control unit for low and medium voltage applications according to the invention comprises:

an internal self-diagnostic function operatively coupled to a signal-generating function;

a binary input operatively coupled to said internal self-diagnostic function;

a low-impedance variable load connectable in parallel to said binary input, said binary input comprising a control function operatively connected to said low-impedance variable load and also operatively connected, through a signal-detecting function, to said internal self-diagnostic function and to said one or more functions of said low or medium voltage apparatus.

In a further aspect, the present invention relates to trip circuit for a low or medium voltage apparatus that comprises a power and control unit having the above described features the binary input of said power and control unit 1 being operatively connectable to said trip circuit through a switch.

In this way, it is possible to overcome some of the disadvantages and drawbacks of the electronic power and control unit of the known art. In practice, thanks to the low-impedance variable load it is possible to generate an oscillating voltage which can be easily recognized by the functional blocks of the binary input, as better described hereinafter, thereby detecting the proper functionality of the binary input itself.

Preferably, said control function comprises a low-impedance feedback and pulse generator which drives said low-impedance variable load. In such a case, said low-impedance feedback and pulse generator advantageously drives said low-impedance variable load so that it oscillates between a first and a second value, thereby generating an oscillating input voltage detectable by said signal-detecting function.

According to a preferred embodiment, said control function comprises a voltage-encoding block converting said input voltage to a digital voltage signal. Said voltage-encoding block encodes and transmits said digitalized input voltage signal to said signal-detecting function. In such a case, the power and control unit of the invention preferably comprises a voltage-decoding block connected in input to said voltage-encoding block and in output to said signal-detecting function.

Advantageously, said signal-detecting function comprises a thresholds detection function of said binary input operatively connected to said binary input and to said one or more functions of said low or medium voltage apparatus, said thresholds detection function being preferably connected in input to said voltage-decoding block and in output to said one or more functions of said low or medium voltage apparatus.

Also, said signal-detecting function can comprises a pulse detection function operatively connected to said binary input and to said internal self-diagnostic function of said power and control unit, said pulse detection function being preferably connected in input to said voltage-decoding block and in output to said internal self-diagnostic function of said power and control unit.

Further characteristics and advantages of the invention will emerge from the description of preferred, but not exclusive, embodiments of the power and control unit for low or medium voltage applications according to the invention, non-limiting examples of which are provided in the attached drawings, wherein:

FIG. 3 is a block scheme of a first particular embodiment of the power and control unit according to the invention.

Figure 1:
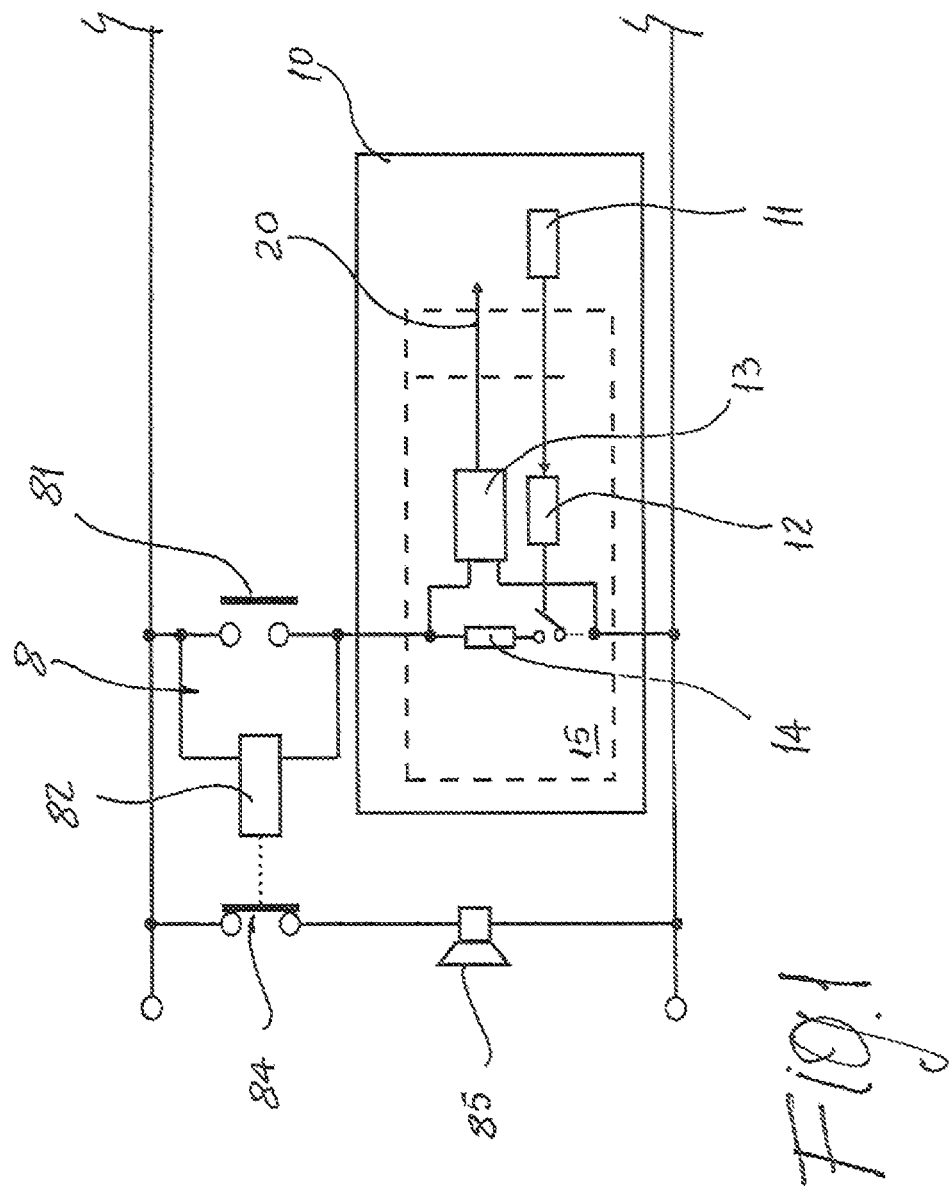
FIG. 1 is a block scheme of an example of a power and control unit according to the prior art.
Figure 2:
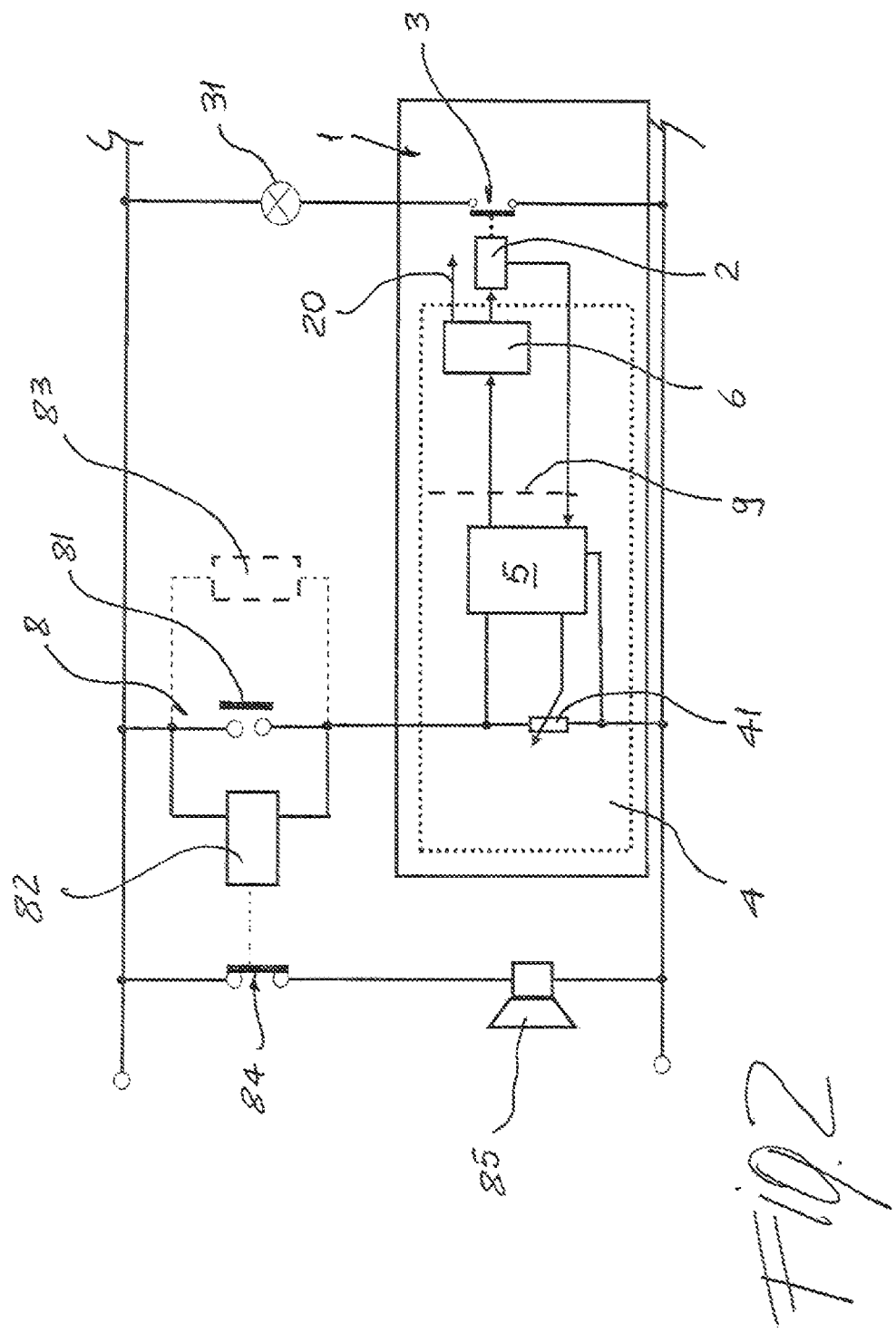
FIG. 2 is a block scheme of a general embodiment of the power and control unit according to the invention.

With reference to FIGS. 2 and 3, a power and control unit for low and medium voltage applications, designated with the reference number 1, is operatively couplable to one or more functions 20 of a low or medium voltage apparatus. These functions include, in general, input controlled by the power and control unit, such as, for example, actuation of a motor, one or more coils, a magnetic actuator, etc.

In its more general definition, power and control unit for low and medium voltage applications according to the invention comprises an internal self-diagnostic function 2 which is operatively coupled to a signal-generating function 3.

As an example, said signal-generating function 3 can comprise a Ready/Watchdog binary output, normally connected to means 31 for displaying the status of the power and control unit itself.

The power and control unit 1 according to the invention further comprises a binary input 4 which is operatively coupled to said internal self-diagnostic function 2. One of the characterizing features of the power and control unit 1 of the invention is given by the fact that it also comprises a low-impedance variable load which is connectable in parallel to said binary input 4.

Moreover, in the power and control unit 1 according to the invention, said binary input 4 comprises a control function 5 which is operatively connected to said low-impedance variable load 41 and also operatively connected, through a signal-detecting function 6, to said internal self-diagnostic function 2 and to said one or more functions 20 of said low or medium voltage apparatus.

As better described in the following, the presence of the low-impedance variable load 41 allows to develop a variable voltage that can be easily detected for diagnostic functions of the binary input itself.

In particular, according to a preferred embodiment of the power and control unit 1 according to the invention, said control function 5 comprises a low-impedance feedback and pulse generator 51 which drives said low-impedance variable load 41. Preferably, said low-impedance feedback and pulse generator 51 drives said low-impedance variable load 41 so that is oscillates between a first and a second value, thereby generating an oscillating input voltage detectable by said signal-detecting function 6.

In this way, an additional third state useful for diagnostic is detected. Indeed, in normal circuits of the prior art, it is possible to detect only two possible conditions, i.e., an active state when the contact 81 is closed and an inactive state when the contact 81 is open. According to the present invention, even if the current circulating, e.g. in a trip circuit supervision relay 82, is low, it is possible, by using a variable impedance 41 oscillating between two values, to generate an oscillating voltage that can be easily recognized by the signal-detecting function 6. Functionality of the binary input 4, as well as external cabling connecting the binary input 4, can therefore be checked.

According to a preferred embodiment of the power and control unit 1 according to the invention, said control function 5 can advantageously comprises a voltage-encoding block 52 converting said input voltage to a digital voltage signal. Said voltage-encoding block 52 usually also encodes and transmits said digitalized input voltage signal to said signal-detecting function 6.

The power and control unit 1 of the invention may also comprise an isolation barrier 9 separating the control function 5 from the signal-detecting function 6. In such a case said voltage-encoding block 52 converts said input voltage to a digital voltage signal, and encodes and transmits said digitalized input voltage signal to said signal-detecting function 6 through said isolation barrier 9.

When the control function 5 includes said voltage-encoding block 52, the power and control unit 1 of the invention preferably comprises a voltage-decoding block 7 connected in input to said voltage-encoding block 52 and in output to said signal-detecting function 6.

According to a preferred embodiment of the power and control unit 1 of the invention, said signal-detecting function 6 comprises a thresholds detection function 61 of said binary input 4 operatively connected to said binary input 4 and to said one or more functions 20 of said low or medium voltage apparatus. Said thresholds detection function 61 of said binary input 4 allows recognizing the command received by the binary inputs 4.

When the power and control unit 1 of the invention comprises said voltage-decoding block 7, said thresholds detection function 61 is connected in input to said voltage-decoding block 7 and in output to said one or more functions 20 of said low or medium voltage apparatus.

Advantageously, said signal-detecting function 6 can comprise a pulse detection function 62 operatively connected to said binary input 4 and to said internal self-diagnostic function 2 of said power and control unit 1. When the power and control unit 1 of the invention comprises said voltage-decoding block 7, said pulse detection function 62 is connected in input to said voltage-decoding block 7 and in output to said internal self-diagnostic function 2 of said power and control unit 1. Thus, pulse detection function 62 senses the pulses generated for the diagnostic and transmit a corresponding signal to the internal self-diagnostic function 2.

The diagnostic function 2 closes the loop: it processes all diagnostic signals coming from the binary inputs and the other circuits (e.g. coil supervision, motor supervision, overcurrent protection, over-temperature protection, capacitor supervision) and reveals the fault(s) using the Ready/Watchdog signal and the low impedance feedback of the same binary inputs.

To increase the reliability of the system, the HW/SW implementing the thresholds detection function 61 and the pulse detection function 62 can be designed in a way that they both work or they do not.

Thus, according to the invention, the low-impedance feedback and pulse generator 51 together with said low-impedance variable load 41 realize a self-oscillating system controlled by the input voltage. When the input voltage reaches zero value, the load impedance is set to a high value; as a result, the voltage start increasing. When the input voltage reaches a minimum voltage level detectable by the diagnostic, the load impedance is set to a low value; as a result, the voltage start decreasing.

It is worth noting that the voltage level used for diagnostic should be lower than the binary input threshold levels, in order to avoid interferences with the main functionalities of the binary input.

The power and control unit of the invention finds convenient application in trip circuits of low and medium voltage apparatuses (e.g., circuit breakers, contactors, disconnectors, and similar), which are also part of the present invention.

A typical example of a trip circuit for a low or medium voltage apparatus according to the invention comprises a power and control unit 1 according to what described in the above, the binary input 4 of said power and control unit 1 being operatively connectable to said trip circuit through a switch 81.

Typically, as shown in FIGS. 2 and 3, a trip circuit according to the present invention includes a trip circuit supervision relay 82 or a resistor 81.

Preferably a trip circuit supervision relay 82 is used, said trip circuit supervision relay 82 being operatively connected to an alarm 85 through a switch 84.

The power and control unit for low and medium applications thus conceived, as well as a trip circuit of low and medium voltage apparatuses including said power and control unit, may undergo numerous modifications, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A power and control unit for low and medium voltage applications operatively couplable to circuit elements of a low or medium voltage apparatus wherein it comprises an internal self-diagnostic circuit element operatively coupled to a signal-generating circuit element, and a binary input operatively coupled to said internal self-diagnostic circuit element, said power and control unit further comprising a low-impedance variable load connectable in parallel to said binary input, said binary input comprising a control circuit element operatively connected to said low-impedance variable load and also operatively connected, through a signal-detecting circuit element, to said internal self-diagnostic circuit element and to said one or more circuit elements of said low or medium voltage apparatus;

wherein said control circuit element comprises a low-impedance feedback and pulse generator which drives said low-impedance variable load.

2. The power and control unit according to claim 1, wherein said low-impedance feedback and pulse generator drives said low-impedance variable load so that is oscillates between a first and a second value, thereby generating an oscillating input voltage detectable by said signal-detecting circuit element.

3. The power and control unit according to claim 2, wherein said control circuit element comprises a voltage-encoding block converting said input voltage to a digital voltage signal.

4. The power and control unit according to claim 2, wherein said signal-detecting circuit element comprises a thresholds detection circuit element of said binary input operatively connected to said binary input and to said one or more circuit elements of said low or medium voltage apparatus.

5. The power and control unit according to claim 3, wherein said voltage-encoding block encodes and transmits said digitalized input voltage signal to said signal-detecting circuit element.

6. The power and control unit according to claim 3, wherein said signal-detecting circuit element comprises a thresholds detection circuit element of said binary input operatively connected to said binary input and to said one or more circuit elements of said low or medium voltage apparatus.

7. The power and control unit according to claim 5, wherein said power and control unit comprises a voltage-decoding block connected in input to said voltage-encoding block and in output to said signal-detecting circuit element.

8. The power and control unit according to claim 5, wherein said signal-detecting circuit element comprises a thresholds detection circuit element of said binary input operatively connected to said binary input and to said one or more circuit elements of said low or medium voltage apparatus.

9. The power and control unit according to claim 7, wherein said signal-detecting circuit element comprises a thresholds detection circuit element of said binary input operatively connected to said binary input and to said one or more circuit elements of said low or medium voltage apparatus and wherein said thresholds detection circuit element is connected in input to said voltage-decoding block and in output to said one or more circuit elements of said low or medium voltage apparatus.

10. The power and control unit according to claim 7, wherein said signal-detecting circuit element comprises a pulse detection circuit element operatively connected to said binary input and to said internal self-diagnostic circuit element—of said power and control unit and wherein said pulse detection circuit element is connected in input to said voltage-decoding block and in output to said internal self-diagnostic circuit element of said power and control unit.

11. The power and control unit according to claim 7, wherein said signal-detecting circuit element comprises a thresholds detection circuit element of said binary input operatively connected to said binary input and to said one or more circuit elements of said low or medium voltage apparatus.

12. The power and control unit according to claim 1, wherein said signal-generating circuit element comprises a Ready/Watchdog binary output.

13. The power and control unit according to claim 1, wherein said signal-detecting circuit element comprises a thresholds detection circuit element of said binary input operatively connected to said binary input and to said one or more circuit elements of said low or medium voltage apparatus.

14. A power and control unit for low and medium voltage applications operatively couplable to circuit elements of a low or medium voltage apparatus wherein it comprises an internal self-diagnostic circuit coupled to said internal self-diagnostic circuit element, said power and control unit further comprising a low-impedance variable load connectable in parallel to said binary input, said binary input comprising a control circuit element operatively connected to said low-impedance variable load and also operatively connected, through a signal-detecting circuit element, to said internal self-diagnostic circuit element and to said one or more circuit elements of said low or medium voltage apparatus;

wherein said signal-detecting circuit element comprises a thresholds detection circuit element of said binary input operatively connected to said binary input and to said one or more circuit elements of said low or medium voltage apparatus.

15. A power and control unit for low and medium voltage applications operatively couplable to circuit elements of a low or medium voltage apparatus wherein it comprises an internal self-diagnostic circuit element operatively coupled to a signal-generating circuit element, and a binary input operatively coupled to said internal self-diagnostic circuit element, said power and control unit further comprising a low-impedance variable load connectable in parallel to said binary input, said binary input comprising a control circuit element operatively connected to said low-impedance internal self-diagnostic circuit element and to said one or more circuit elements of said low or medium voltage apparatus;

wherein said signal-detecting circuit element comprises a pulse detection circuit element operatively connected to said binary input and to said internal self-diagnostic circuit element of said power and control unit.

16. A power and control unit for low and medium voltage applications operatively couplable to circuit elements of a low or medium voltage apparatus wherein it comprises an internal self-diagnostic circuit element operatively coupled to a signal-generating circuit element, and a binary input operatively coupled to said internal self-diagnostic circuit element, said power and control unit further comprising a low-impedance variable load connectable in parallel to said binary input, said binary input comprising a control circuit element operatively connected to said low-impedance variable load and also operatively connected, through a signal-detecting circuit element, to said internal self-diagnostic circuit element and to said one or more circuit elements of said low or medium voltage apparatus, the binary input of said power and control unit being operatively connectable to said trip circuit through a switch.

17. A trip circuit according to claim 16, wherein it comprises a trip circuit supervision relay or a resistor.

18. A trip circuit according to claim 17, wherein said trip circuit supervision relay is operatively connected to an alarm through a switch.

19. A low or medium voltage apparatus comprising a trip circuit according to claim 16.

\* \* \* \* \*